(12) United States Patent
Shao et al.

(10) Patent No.: US 10,397,676 B2
(45) Date of Patent: Aug. 27, 2019

(54) SPEAKER MODULE

(71) Applicant: Goertek.Inc, Weifang, Shandong (CN)

(72) Inventors: Minghui Shao, Weifang (CN); Jianbin Yang, Weifang (CN)

(73) Assignee: Goertek.Inc, Weifang, Shandong (CN)

( * ) Notice: Subject to any disclaimer, the term of this patent is extended or adjusted under 35 U.S.C. 154(b) by 0 days.

(21) Appl. No.: 15/542,866

(22) PCT Filed: Nov. 18, 2015

(86) PCT No.: PCT/CN2015/094929
§ 371 (c)(1),
(2) Date: Jul. 11, 2017

(87) PCT Pub. No.: WO2016/155328
PCT Pub. Date: Oct. 6, 2016

(65) Prior Publication Data
US 2018/0014098 A1 Jan. 11, 2018

(30) Foreign Application Priority Data

Mar. 31, 2015 (CN) .......................... 2015 1 0149832

(51) Int. Cl.
*H04R 1/02* (2006.01)
*H04R 7/12* (2006.01)
(Continued)

(52) U.S. Cl.
CPC ............. *H04R 1/025* (2013.01); *H04R 7/127* (2013.01); *H04R 7/18* (2013.01); *H04R 9/022* (2013.01);
(Continued)

(58) Field of Classification Search
CPC . H04R 9/06; H04R 9/02; H04R 9/025; H04R 9/046; H04R 7/18; H04R 7/127;
(Continued)

(56) References Cited

U.S. PATENT DOCUMENTS

| 2010/0008028 | A1* | 1/2010 | Richardson | ........... G06F 1/1626 |
| | | | | 361/679.01 |
| 2011/0305361 | A1* | 12/2011 | Li | ........................... C22C 1/005 |
| | | | | 381/380 |
| 2015/0304747 | A1* | 10/2015 | Wang | ....................... H04R 5/02 |
| | | | | 381/345 |

FOREIGN PATENT DOCUMENTS

| CN | 102506317 A | 6/2012 |
| CN | 103037291 A | 4/2013 |

(Continued)

OTHER PUBLICATIONS

Lasance "Thermal Conductivity of Filled Plastics", May 1, 2009, pp. 1-9, and https://www.electronics-cooling.com/2009/05/thermal-conductivity-of-filled-plastics/# (Year: 2009).*

(Continued)

*Primary Examiner* — Leshui Zhang
(74) *Attorney, Agent, or Firm* — Venable LLP; Michele V. Frank

(57) ABSTRACT

The present invention discloses a speaker module, comprising: a speaker assembly, a module shell and a front cover. The module shell is configured to bear the speaker assembly, and comprises a first shell and a second shell, wherein the first shell is doped with a thermally conductive filler. The front cover is configured to cooperate with the module shell to encapsulate the speaker assembly. The speaker module provided by the present invention can quickly discharge heat generated by the speaker assembly during operation through the module shell to prevent overheat of the speaker assembly, thereby avoiding performance loss of a speaker due to high temperature.

7 Claims, 2 Drawing Sheets

(51) Int. Cl.
  *H04R 7/18* (2006.01)
  *H04R 9/02* (2006.01)
  *H04R 9/06* (2006.01)
  *H04R 31/00* (2006.01)
  *B29C 45/00* (2006.01)
  *B29K 105/16* (2006.01)
  *B29L 31/34* (2006.01)

(52) U.S. Cl.
  CPC ............... *H04R 9/025* (2013.01); *H04R 9/06* (2013.01); *H04R 31/006* (2013.01); *B29C 45/0013* (2013.01); *B29K 2105/16* (2013.01); *B29K 2995/0013* (2013.01); *B29L 2031/3418* (2013.01)

(58) Field of Classification Search
  CPC ...... H04R 1/025; H04R 1/2826; H04R 1/021; H04R 1/2888; H04R 1/2857; H04R 1/2842; H04R 1/02; H04R 2499/11; H04R 15/00; H04R 3/00; H04R 2209/00
  USPC ... 381/86, 87, 332, 333, 334, 111, 116, 117, 381/345, 346, 351, 353, 354, 162, 164, 381/165, 166, 167, 370, 371, 372, 373, 381/374, 383, 384, 385, 386, 388, 389, 381/400, 401, 402, 406; 181/202
  See application file for complete search history.

(56) References Cited

FOREIGN PATENT DOCUMENTS

| | | |
|---|---|---|
| CN | 203015059 U | 6/2013 |
| CN | 204442660 U | 7/2015 |
| CN | 104902356 A | 9/2015 |
| JP | 60048698 A * | 3/1985 ............. H04R 9/022 |
| WO | WO-2014032550 A1 * | 3/2014 ............... H04R 5/02 |

OTHER PUBLICATIONS

International Search Report and English language translation dated Jan. 25, 2016 in International Patent Application No. PCT/CN2015/094929.

Written Opinion dated Jan. 25, 2016 in International Patent Application No. PCT/CN2015/094929.

* cited by examiner

SPEAKER MODULE

TECHNICAL FIELD

The present invention relates to a speaker module, and more particularly, to a micro speaker module with an excellent heat dissipation effect.

BACKGROUND

As electronic parts commonly-used in mobile phones, mobile computers and other electronic products, micro speaker modules offer people conveniences in many aspects such as communications and entertainment in life. At present, the development trend of the mobile phones and other devices is thinner, smaller in size, and better in function. Accordingly, the sizes of various parts in the mobile phones also need to be further miniaturized.

The micro speaker module is a component that occupies a relatively large space in the mobile phone, so how to reduce the size of the micro speaker module is the key to further reduce the thickness and the size of the mobile phone. The main research and development direction of the person skilled in the art is to reduce the cost of the space occupied by a micro speaker. At this stage, the main means of reducing the size of the micro speaker is performed by changing layout and structural characteristics of all components of the speaker as well as reducing the size of each component. For example, it is implemented by reducing the size of a voice coil and a magnet. Accordingly, while reducing the size of the micro speaker, the performance of the micro speaker also needs to be continuously improved, avoiding the reduction of the performance caused by the size reduction. Therefore, how to improve the performance of the micro speaker has become another main research and development direction for those skilled in the art. The improvement of the performance of the micro speaker mainly relates to the characteristics of enhanced magnetic field intensity, more free vibration of a vibration diaphragm and the voice coil, larger vibration amplitude and the like. At present, the main research and development direction of the person skilled in the art is to reduce the size of the micro speaker and to improve the performance of the micro speaker.

However, the inventor of the present invention finds in a case that the size of the micro speaker is reduced and the power is increased, more heat is generated during operation, which is a factor that restricts its own performance. When a micro speaker module relatively high in power operates, the voice coil will generate more heat, resulting in substantial temperature increase of a speaker structure. As the size of the micro speaker is too small to immediately release heat, the temperature of parts, such as the vibration diaphragm, the magnet, an injection-molded shell, around the voice coil will be substantially increased. Those skilled in the art are not aware that the combined factor of reduced size and increased power can cause a significant high temperature problem. If the internal temperature of the micro speaker module is too high, it will cause the following problems that the vibration diaphragm becomes soft, the magnet is demagnetized and the injection-molded shell is deformed, eventually leading to performance degradation, or even failure of the speaker. Therefore, the inventor of the present invention realizes when the operation power of the micro speaker is increased, heat resistance of respective components of the speaker and a heat dissipation capacity of the speaker system become an obstacle in the way of improving the overall performance of the speaker.

In general, when the speaker temperature is too high, in most cases, the heat dissipation capacity of a product can be improved by using a pure metal shell or adding a metal cooling fin. However, for a micro speaker used in a communication terminal such as a mobile phone, a shell containing too much metal will affect the performance of an antenna near the speaker and hinder normal operation of the antenna and related parts. On the other hand, the size of the cooling fin cannot be too large due to the limited size of the micro speaker module, so ideal cooling requirements cannot be met generally. While it is inevitable that the number of components inside the speaker is increased after the cooling fin is arranged, so the space required and occupied by the speaker is increased. Therefore, arranging the cooling pin in the micro speaker cannot effectively solve the heat dissipation problem, instead increasing the size. Thus, the inventor of the present invention believes that it is necessary to provide a solution which can provide an excellent heat dissipation environment without affecting the normal operation of the antenna or the other related parts, or increasing the size of the micro speaker.

SUMMARY

An object of the present invention is to provide a speaker module excellent in heat dissipation performance.

According to an aspect of the present invention, there is provided a speaker module, comprising: a speaker assembly; and a module shell bearing the speaker assembly, wherein a material of the module shell is doped with a thermally conductive filler.

The module shell may comprise a first shell and a second shell; the second shell and the first shell are mounted in a combined manner; and a material of the first shell is doped with the thermally conductive filler. Further, a material of the second shell may also be doped with the thermally conductive filler.

The module shell may further comprise a front cover mounted on the first shell or the second shell; and a material of the front cover is doped with the thermally conductive filler.

Preferably, the material of the module shell is plastic; and during injection molding, the plastic is doped with particles or powder of the thermally conductive filler.

The speaker assembly may comprise a independent shell, and a material of the independent shell is doped with the thermally conductive filler.

The thermally conductive filler may be silicon carbide, fibrous carbon powder, scaly carbon powder or boron nitride. Alternatively, the thermally conductive filler is a metal material.

Preferably, the mass ratio and/or volume ratio of the thermally conductive filler to the first shell are/is greater than 0.5%. A thermal conductivity coefficient of the thermally conductive filler is greater than 20 W/(m*k).

In addition, the speaker module may further comprise a thermally conductive plate mounted at the bottom of the speaker assembly.

In the speaker module provided by the present invention, the heat dissipation performance of the module is effectively improved by improving the module shell, so that heat generated when the speaker module operates can be quickly discharged, preventing high temperature from affecting the normal operation of the speaker. Further features of the present invention and advantages thereof will become apparent from the following detailed description of exemplary embodiments according to the present invention with reference to the attached drawings.

BRIEF DESCRIPTION OF THE DRAWINGS

The accompanying drawings, which are incorporated in and constitute a part of the specification, illustrate embodiments of the present invention and, together with the description thereof, serve to explain the principles of the present invention.

DETAILED DESCRIPTION

Figure 1:
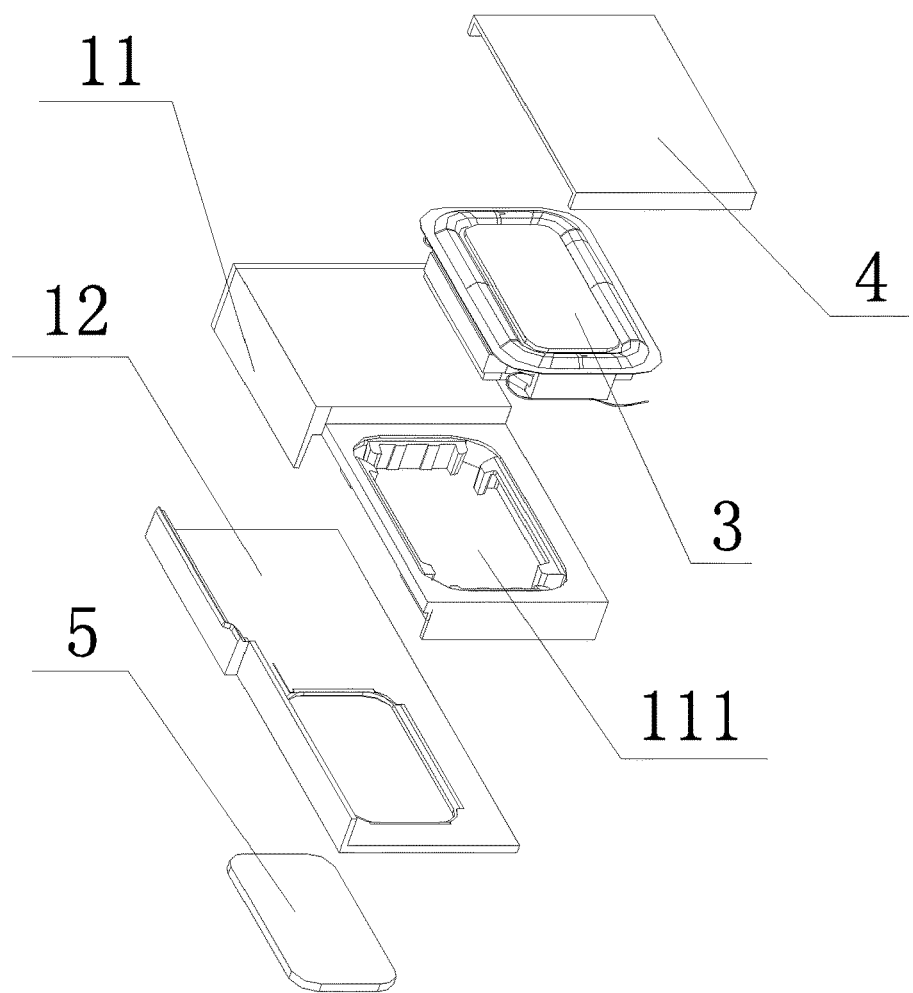
FIG. 1 is a structural exploded view of a speaker module according to a specific embodiment of the present invention.

Various exemplary embodiments of the present invention will now be described in detail with reference to the drawings. It should be noted that the relative arrangement of the components and steps, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses.

Techniques, methods and apparatus as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed in the accompanying drawings.

The present invention provides a speaker module, comprising: a speaker assembly, a module shell, and a module front cover. The speaker assembly comprises device parts for making a sound, such as an electromagnetic component and a vibration component. The speaker assembly is mounted in the module shell. In order to facilitate the assembling of the speaker assembly, the module shell comprises a first shell and a second shell. The front cover is mounted in cooperation with the module shell to encapsulate the speaker assembly in the module shell. In particular, in order to enhance the heat dissipation performance of the module shell, the first shell is doped with a thermally conductive filler.

In a specific embodiment, as shown in FIG. 1, the first shell 11 is provided with a speaker slot 111; and the speaker assembly 3 is mounted inside the speaker slot 111. The second shell 12 and the first shell 11 may be mounted in an upper-and-lower combined manner. For example, the second shell 12 is mounted below the first shell 11 to seal the speaker assembly 3 from the bottom of the speaker slot 111. In particular, in order to facilitate assembling and heat dissipation, the second shell 12 may be provided with an opening corresponding to the speaker slot 111. When the speaker assembly 3 is mounted in the speaker slot 111, the bottom of the speaker assembly 3 cannot be in contact the lower surface of the second shell generally; if the second shell is provided with the opening, the bottom of the speaker assembly 3 is indented to the inside of the speaker shell 111 for a certain distance with respect to the surface of the second shell, so that the bottom of the speaker assembly 3 cannot be in contact an external structure. In the embodiments of the present invention, a thermally conductive plate 5 may be mounted at the bottom of the speaker assembly 3 and is configured to connect the bottom of the speaker assembly 3 onto an external shell, such as a shell of an electronic device, so as to transfer heat. The thermally conductive plate 5 may be made of a metal material or a non-metal material with high thermal conductivity, and a person skilled in the art can select a magnetic conductive plate made of a metal depending on an actual situation that the metal material does not affect the normal operation of electromagnetic devices such as an antenna. The front cover 4 may be mounted on the first shell 11 to seal the front side of the speaker slot 111, so as to protect the speaker assembly.

The vibration component of the speaker assembly 3 may comprise a vibration diaphragm and a voice coil. The electromagnetic component may comprise a magnet and a spring washer. In addition, the speaker assembly 3 may further comprise a independent shell. In the embodiment described in FIG. 1 of the present invention, the speaker module is an integrated module, and the speaker assembly 3 does not comprise the independent shell. In another embodiment of the present invention, the speaker assembly 3 comprises the independent shell; the vibration diaphragm, the voice coil, the magnet and the spring washer are mounted in the independent shell; and the independent shell is mounted in the speaker slot 111. In particular, in order to enhance the heat dissipation effect of the speaker assembly 3, the independent shell may also be doped with the thermally conductive filler 2. The independent shell is in contact with the first shell 11, so that the heat generated by the vibration diaphragm and the voice coil can be efficiently discharged.

Figure 2:
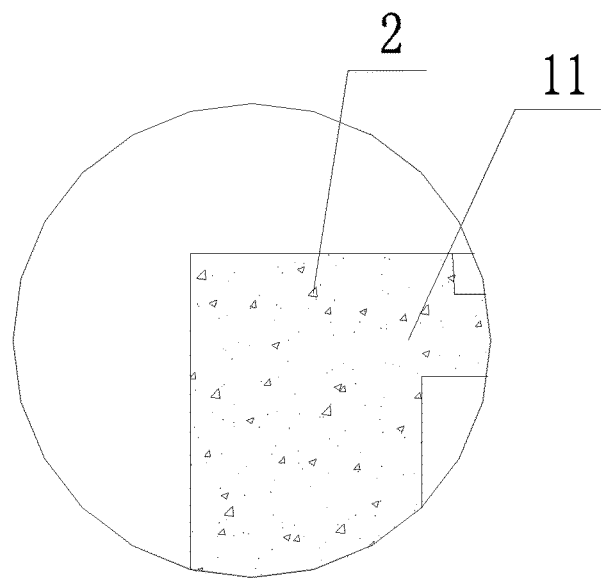
FIG. 2 is a schematic view of a thermally conductive filler doped in a first shell of the present invention.

The thermally conductive filler 2 is configured to improve the thermal conductivity of the first shell 11, the second shell 12 and the independent shell. In general, the first shell 11, the second shell 12 and the independent shell may be made of plastic. As shown in FIG. 2, during injection molding, the particles or powder of the thermally conductive material may be doped into an injection molding material, and the thermally conductive filler 2 is distributed in the plastic as evenly as possible, so as to improve the thermal conductivity of the shell. A thermal conductivity coefficient of the plastic is very low, usually less than 1 W/(m*k), and a thermal conductivity coefficient of the thermally conductive filler 2 is preferably greater than 20 W/(m*k), so that it can ensure that after the material of the shell material is doped with the thermally conductive filler 2, the heat dissipation effect is obviously improved. For example, a metal material, such as copper powder, aluminum powder or the like, may be used as the thermally conductive filler 2. The metal material has excellent thermal conductivity, but the metal thermally conductive filler 2 will affect the normal operation of other parts in the electronic device. Therefore, the thermally conductive filler 2 may also be a non-metal material, such as silicon carbide, fibrous carbon powder, scaly carbon powder, boron nitride or other materials. The carbon powder is very high in thermal conductivity coefficient but expensive, so it is generally suitable for being applied to precision instruments, rather than common speaker structures. Boron nitride, silicon carbide and other materials have a thermal conductivity coefficient greater than 50 W/(m*k), respectively, so they are suitable for being applied to shells of the common speaker structures. The thermally conductive filler 2 may be in the form of particles, flakes, spheres, fibrous, whiskers or the like. Those skilled in the art can prepare the powder of thermally conductive filler 2 different in forms. The flaky and fibrous thermally conductive fillers 2 have a higher thermal conductivity coefficient in some directions, while the granular and spherical thermally conductive fillers 2 have a uniform thermal conductivity coefficient in all directions. The size of the thermally conductive filler 2 may also be adjusted in accordance with actual requirements, wherein the size of the particles of the thermally conductive filler 2 are from the nanoscale to the centimeter level, in particular to the size of a material subjected to ultra-fine processing. In addition, before the thermally conductive filler 2 is doped and filled into the plastic material, the surface of the thermally conductive filler 2 may be modified to enhance the adhesive strength between a substrate and the thermally conductive filler.

In particular, a mass ratio of the thermally conductive filler 2 to the first shell 11 should be greater than 0.5%, so as to ensure that after the first shell 11 is filled with the thermally conductive filler 2, the thermal conductivity coefficient is significantly increased, improving the thermal conductivity effect. Preferably, a volume ratio of the thermally conductive filler 2 to the first shell 11 should also be greater than 0.5%.

Figure 3:
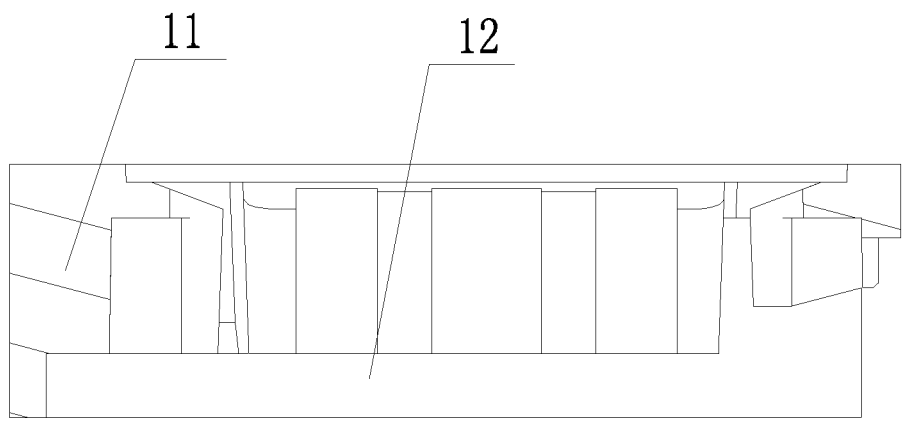
FIG. 3 is a sectional view of the first shell and a second shell according to a specific embodiment of the present invention.

Moreover, as shown in FIG. 3, in the above-described embodiments of the present invention, the first shell 11 is doped and filled with the thermally conductive filler 2, while the second shell 12 is not doped with the thermally conductive filler 2. When the plastic shell is filled with the thermal filler 2, the structural stability, strength, toughness and the like of the plastic are changed. In order to prevent the performance change of the plastic shell from affecting the reliability and sound quality of the speaker module, in this embodiment, only the first shell 11 is doped with the thermally conductive filler 2. In other embodiments, the thermally conductive filler 2 may also be doped in the second shell 12 under a condition that the reliability of the speaker module is ensured. In addition, when the speaker assembly 3 comprises the independent shell, the independent shell may also be doped with the thermally conductive filler 2, so that the heat generated during the operation of the vibration diaphragm and the voice coil can be smoothly discharged from the independent shell, and then the heat is conducted out of the device through the first shell 11 and the second shell 12. Preferably, in order to ensure that the thermally conductive filler 2 does not affect the normal operation of other parts in the electronic device, the thermally conductive material doped in the first shell 11 and the second shell 12 may be a non-metal material, such as silicon carbide or boron nitride.

Figure 4:
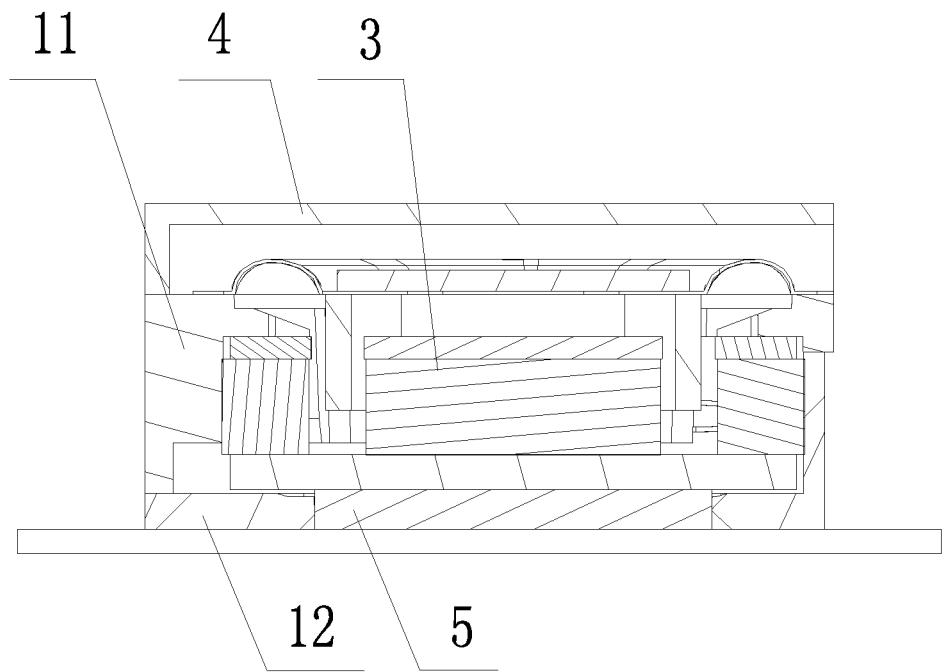
FIG. 4 is a sectional view of a speaker module according to a specific embodiment of the present invention.

As shown in FIG. 4, the heat generated during the operation of the speaker assembly 3 can be conducted out through the first shell 11 and the second shell 12 at the sides and the thermally conductive plate 5 at the bottom. The shell doped and filled with the thermally conductive filler 2, and the thermally conductive plate 5 have good thermal conductivity coefficients, so that heat can be quickly and efficiently conducted out, thereby preventing the magnet from demagnetizing and the vibration diaphragm from softening due to the high temperature, and avoiding the reduction of the operation quality of the speaker.

Although some specific embodiments of the present invention have been demonstrated in detail with examples, it should be understood by a person skilled in the art that the above examples are only intended to be illustrative but not to limit the scope of the present invention. It should be understood by those skilled in the art that the above embodiments can be modified without departing from the scope and spirit of the present invention. The scope of the present invention is defined by the appended claims.

What is claimed is:

1. A speaker module for being used in a mobile electronic product, comprising:
   a speaker assembly; and
   a module shell bearing the speaker assembly, wherein a material of the module shell is doped with a thermally conductive filler,
   wherein the material of the module shell is plastic and wherein the module shell comprises a first shell and a second shell
   wherein the first shell is provided with a speaker slot and the speaker slot is positioned at the same side of the first shell and the second shell and the speaker assembly is mounted inside the speaker slot,
   wherein the second shell and the first shell are mounted in a combined manner,
   wherein, the material of the first shell is plastic and during injection molding, the plastic of the first shell is doped with particles or powder of the thermally conductive filler, and
   wherein the material of the second shell is plastic and the plastic of the second shell is not doped with the thermally conductive filler to prevent a performance change of the second shell from affecting the reliability and sound quality of the speaker module.

2. The speaker module of claim 1, wherein the module shell comprises a front cover mounted on the first shell or the second shell; and a material of the front cover is doped with the thermally conductive filler.

3. The speaker module of claim 1, wherein the speaker assembly comprises an independent shell; and a material of the independent shell is doped with the thermally conductive filler.

4. The speaker module of claim 1, wherein the thermally conductive filler is silicon carbide, fibrous carbon powder, scaly carbon powder, boron nitride, or a metal material.

5. The speaker module of claim 1, wherein a mass ratio and/or a volume ratio of the thermally conductive filler to the first shell are/is greater than 0.5%.

6. The speaker module of claim 1, wherein a thermal conductivity coefficient of the thermally conductive filler is greater than 20 W/(m*k).

7. The speaker module of claim 1, further comprising a thermally conductive plate mounted at the bottom of the speaker assembly.

* * * * *